United States Patent
Malinowski et al.

(10) Patent No.: US 10,787,101 B2
(45) Date of Patent: Sep. 29, 2020

(54) ADJUSTMENT MECHANISM FOR A VEHICLE

(71) Applicant: Faurecia Automotive Seating, LLC, Auburn Hills, MI (US)

(72) Inventors: Maciej Malinowski, Warsaw (PL); Marcin Debniak, Warsaw (PL)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 162 days.

(21) Appl. No.: 16/017,166

(22) Filed: Jun. 25, 2018

(65) Prior Publication Data
US 2019/0389336 A1    Dec. 26, 2019

(51) Int. Cl.
*B60N 2/22* (2006.01)
*F16D 63/00* (2006.01)
*F16H 1/06* (2006.01)

(52) U.S. Cl.
CPC ......... *B60N 2/2227* (2013.01); *B60N 2/2213* (2013.01); *F16D 63/006* (2013.01); *F16H 1/06* (2013.01)

(58) Field of Classification Search
CPC .. B60N 2/2227; B60N 2/2213; B60N 2/0232; B60N 2/0276; B60N 2/067; B60N 2/0727; B60N 2/08; B60N 2/0862; B60N 2/0868; B60N 2/0875; B60N 2/16; B60N 2/1635; B60N 2/164; B60N 2/1645; B60N 2/165; B60N 2/168; B60N 2/1685; B60N 2/433; B60N 2/427; B60N 2/42727; B60N 2/42736; B60N 2/42745; B60N 2/42754; B60N 2/42781; B60N 2/43; B60N 2002/0236; B60N 2002/024; F16D 63/006; F16H 1/06; B65G 13/075
USPC .......................................................... 74/411.5
See application file for complete search history.

(56) References Cited

U.S. PATENT DOCUMENTS

| 3,214,999 A * | 11/1965 | Lapp ..................... F16H 49/001 74/665 D |
| 4,781,416 A * | 11/1988 | Johnson ................ B60N 2/2252 297/362 |
| 5,507,553 A * | 4/1996 | Nishizawa ............. B60N 2/433 297/216.13 |
| 5,884,972 A * | 3/1999 | Deptolla ................ B60N 2/433 297/216.14 |
| 6,230,867 B1 * | 5/2001 | Schwarzbich ......... B60N 2/167 192/223.2 |
| 7,424,940 B2 | 9/2008 | Klopp |
| 9,139,109 B2 * | 9/2015 | Pera ...................... B60N 2/0232 |
| 2008/0136242 A1 * | 6/2008 | Stemmer ............... B60N 2/2254 297/362 |
| 2011/0169312 A1 | 7/2011 | Desquesne |

(Continued)

FOREIGN PATENT DOCUMENTS

| CN | 102120428 | 7/2011 |
| CN | 105064915 | 11/2015 |
| FR | 2984249 | 6/2013 |

(Continued)

*Primary Examiner* — Victor L MacArthur
*Assistant Examiner* — T. Scott Fix
(74) *Attorney, Agent, or Firm* — Barnes & Thornburg LLP

(57) ABSTRACT

An adjustment mechanism for a vehicle seat includes an actuator and a driven member. The actuator is coupled to the driven member to cause the driven member to move or be freed to move in response to activating the actuator.

14 Claims, 6 Drawing Sheets

(56) References Cited

U.S. PATENT DOCUMENTS

2013/0180348 A1\* 7/2013 Andres ................ B60N 2/2252
                                                          74/89.14
2018/0099583 A1\* 4/2018 Yagi ..................... B60N 2/1635

FOREIGN PATENT DOCUMENTS

| JP | 2013244084 | 12/2013 |
|---|---|---|
| WO | 2005024264 | 3/2005 |

\* cited by examiner

ADJUSTMENT MECHANISM FOR A VEHICLE

BACKGROUND

The present disclosure relates to an adjustment mechanism for a vehicle, and particularly to an adjustment mechanism for a vehicle seat. More particularly, the present disclosure relates to an adjustment mechanism for a vehicle seat having a rotatable pinion.

SUMMARY

According to the present disclosure, an adjustment mechanism for a vehicle seat includes an actuator and a driven member. The actuator is coupled to the driven member to cause the driven member to move or be freed to move in response to activating the actuator.

In illustrative embodiments, an adjustment mechanism for a vehicle seat and a method for inhibiting rotation of a pinion of an adjustment mechanism include a rotatable pinion that is located within a braking collar and that is adapted to engage the braking collar when the pinion is displaced from an operational position to a displaced position. The pinion includes an exterior engagement surface that is adapted to engage an interior engagement surface of the braking collar to inhibit or block rotation of the pinion.

In illustrative embodiments, the braking collar and the interior engagement surface of the braking collar are generally oval shaped. The exterior engagement surface of the pinion is adapted to engage a first braking segment and a second braking segment of the braking collar at a first end of the braking collar when the pinion is displaced to a first displaced position. The exterior engagement surface of the pinion is adapted to engage a third braking segment and a fourth braking segment of the braking collar when the pinion is displaced to a second displaced position.

In illustrative embodiments, the exterior engagement surface of the pinion includes a plurality of teeth and the interior engagement surface of the braking collar includes a plurality of teeth. The teeth of the interior engagement surface of the pinion are adapted to engage the teeth of the interior engagement surface of the braking collar when the pinion is in a displaced position to inhibit or block rotation of the pinion.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 6:
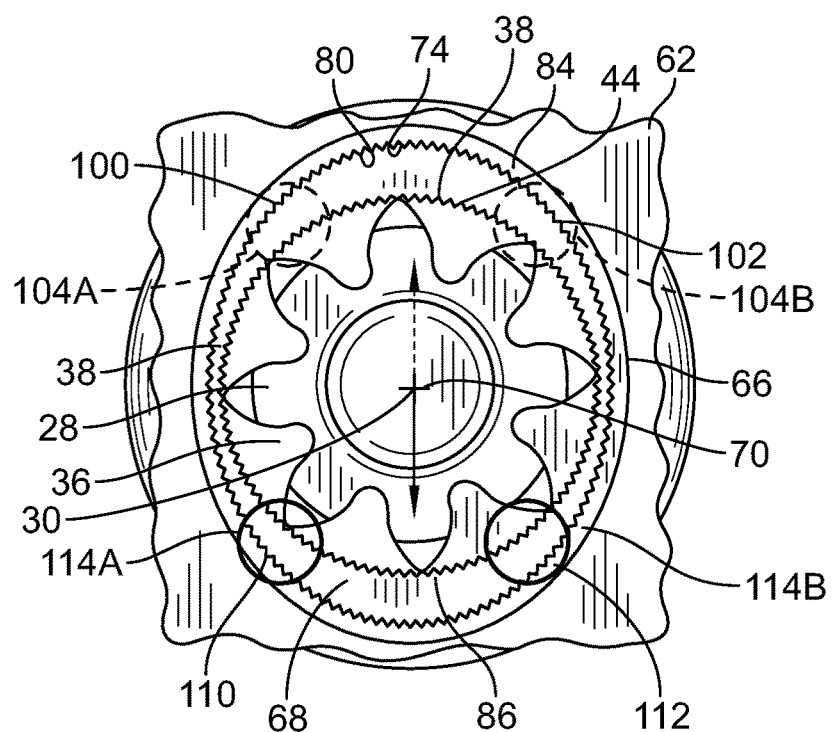
Figure 7:
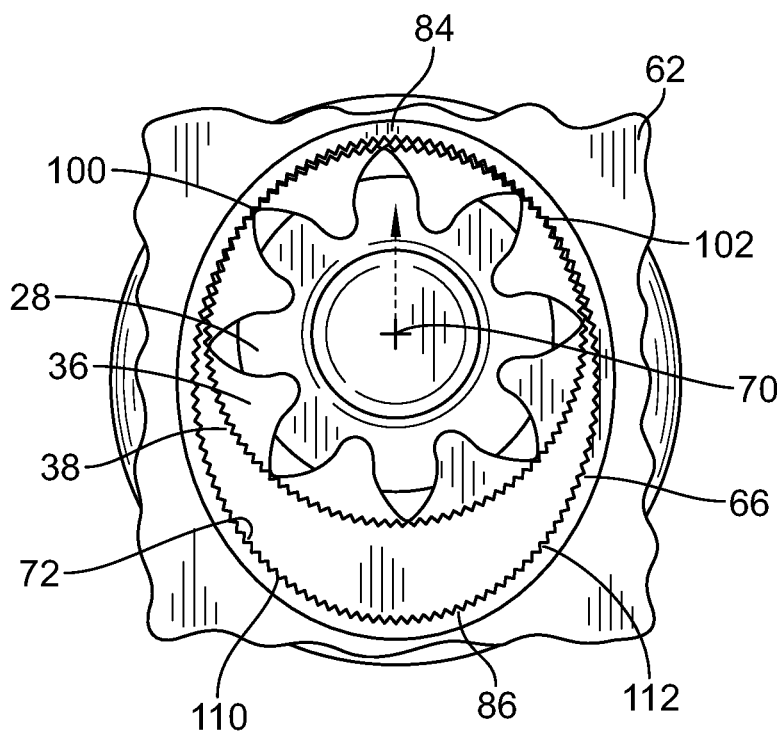
Figure 8:
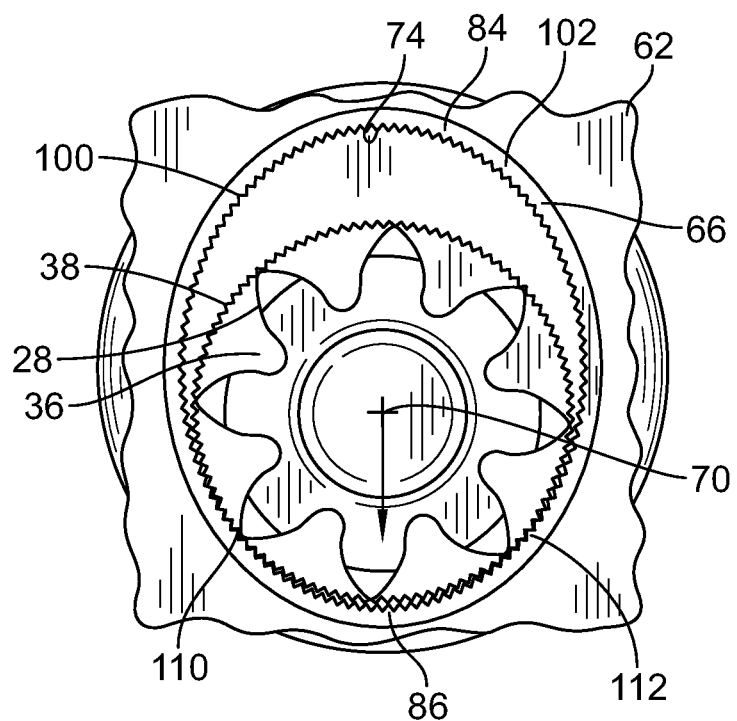
Figure 9:
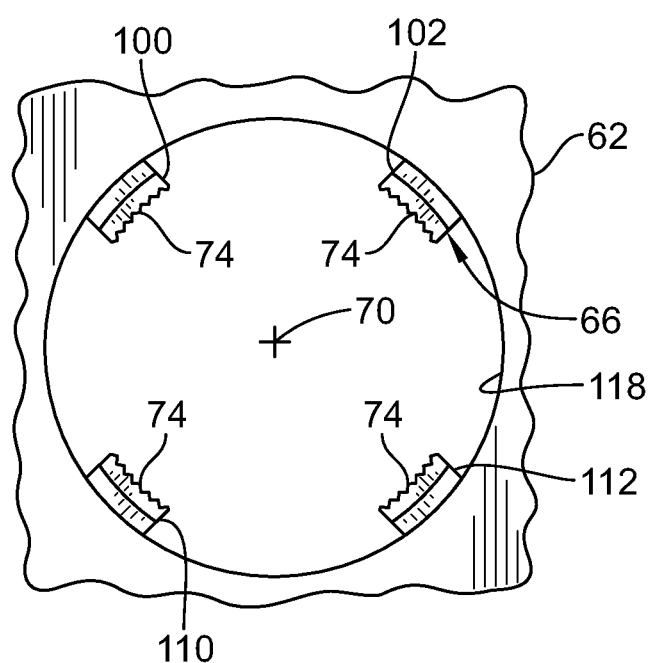
Figure 10:
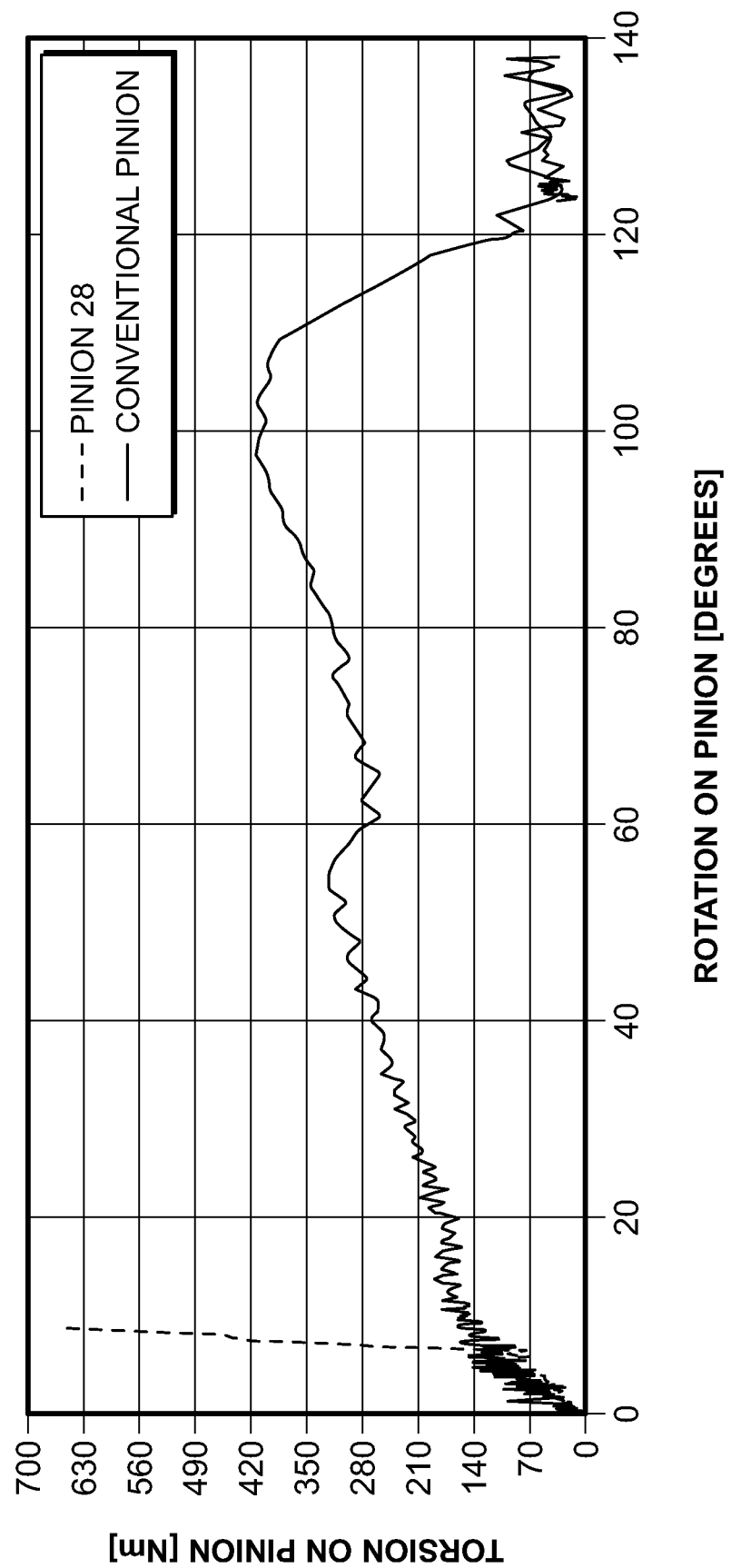

FIG. 6 is a partial front elevational view showing the pinion of the actuator located in the operational position within the braking collar and spaced apart from the braking collar, with dashed circles indicating the two segments of the braking collar the pinion will engage when the pinion is displaced from the operational position as shown in FIG. 6 to a first displaced position as shown in FIG. 7, and with solid circles indicating the two segments of the braking collar the pinion will engage when the pinion is displaced from the operational position as shown in FIG. 6 to a second displaced position as shown in FIG. 8;

FIG. 7 is partial front elevational view showing the pinion radially displaced from the operational position to the first displaced position in engagement with first and second braking segments of the braking collar;

FIG. 8 is a partial front elevational view showing the pinion radially displaced from the operational position to the second displaced position in engagement with third and fourth braking segments of the braking collar;

FIG. 9 shows another embodiment of the braking collar including four spaced apart individual braking segments of the braking collar; and FIG. 10 is a graph showing the amount of torsion on the pinion versus the rotation of the pinion in a dashed line when using the braking collar of the present disclosure with teeth, and showing the torsion on the pinion versus the rotation of the pinion in a solid line when using a smooth circular aperture.

DETAILED DESCRIPTION

Figure 1:
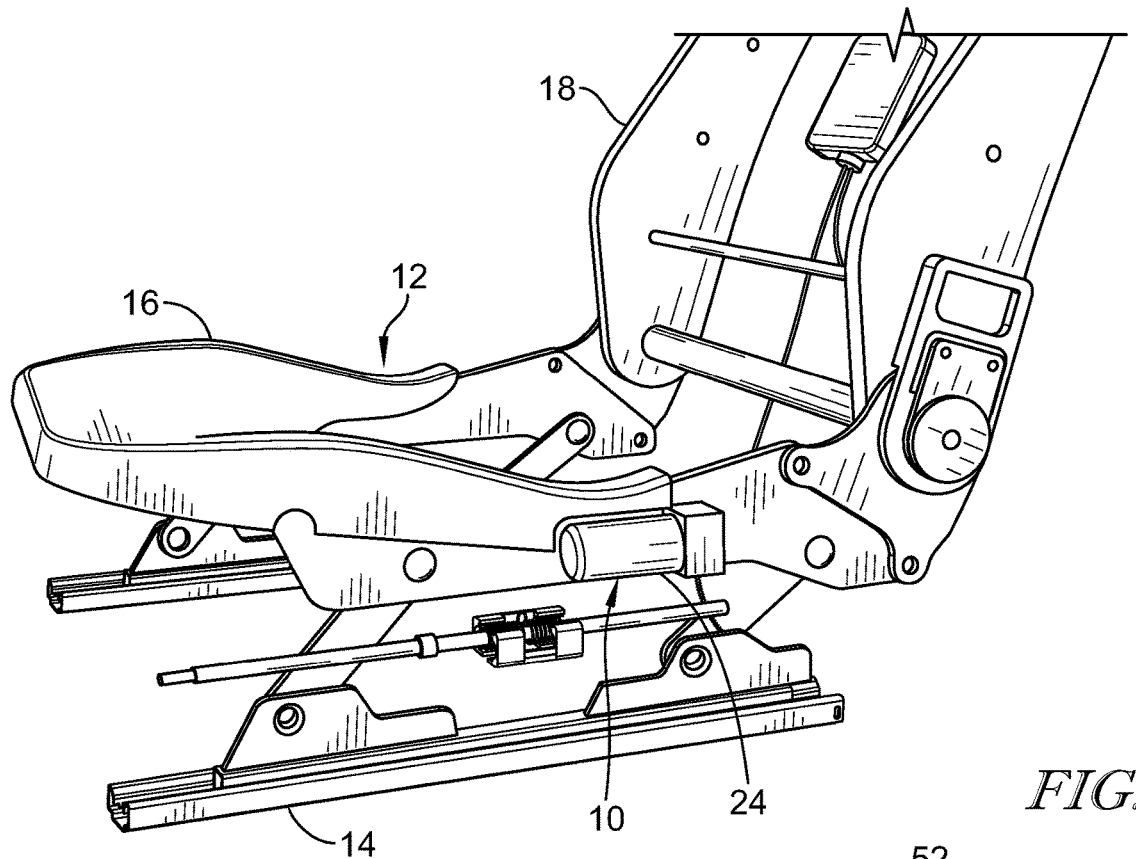
FIG. 1 is a partial perspective view of a vehicle seat including an adjustment mechanism.
Figure 2:
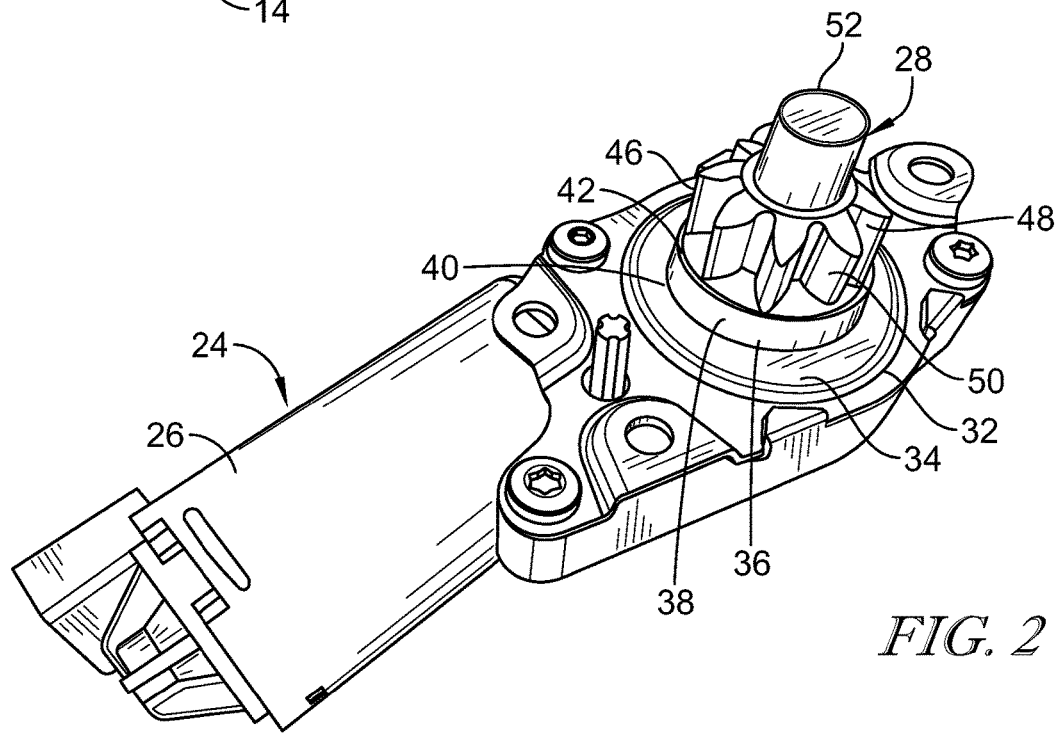
FIG. 2 is a perspective view of an actuator of the adjustment mechanism for adjusting the vehicle seat.

An adjustment mechanism 10 for providing selective adjustment of a vehicle seat 12 is shown in FIGS. 3-8. Vehicle seat 12 may include a base 14 adapted to be connected to a floor of a vehicle, a seat bottom 16 adjustably coupled to base 14 such that the height of the seat bottom 16 with respect to base 14 can be selectively adjusted upwardly or downwardly, and a seat back 18 adjustably coupled to seat bottom 16 such that seat back 18 can be positioned at a desired inclination with respect to seat bottom 16. In the illustrative embodiment as shown in FIG. 1, adjustment mechanism 10 is coupled to seat bottom 16 of vehicle seat 12 to provide for selective height adjustment of seat bottom 16.

Adjustment mechanism 10 includes an actuator 24 having a body 26 that is adapted to be coupled fixedly to a mounting member such as seat bottom 16. Actuator 24 includes a rotatable pinion 28 that is selectively rotatable about a central axis 30 of pinion 28 with respect to body 26. Pinion 28 includes a base 32 having a generally annular wall 34 that is located generally concentrically about central axis 30 and adjacent body 26. Pinion 28 also includes a generally cylindrical hub 36 having a generally cylindrical exterior engagement surface 38. Exterior engagement surface 38 extends between a generally circular inner edge 40 located adjacent annular wall 34 and a generally circular outer edge 42.

Pinion 28 also includes a drive member 46. Drive member 46 comprises a gear 48 having a plurality of gear teeth 50. Drive member 46 is located concentrically with central axis 30 and is located longitudinally outwardly from hub 36 along central axis 30. Pinion 28 also includes a generally cylindrical tip 52 located concentrically with central axis 30 and located longitudinally outwardly from drive member 46 along central axis 30. Base 32, hub 36, exterior engagement surface 38 of hub 36, drive member 46 and tip 52 conjointly rotate with one another about central axis 30 of pinion 28 in either a clockwise direction or a counter-clockwise direction as desired. Actuator 24 may include a motor for selectively rotating pinion 28 about central axis 30.

Exterior engagement surface 38 of hub 36 may be treated to increase the coefficient of friction of the exterior engagement surface 38. Exterior engagement surface 38 may be treated such that exterior engagement surface 38 is textured, such as by knurling, to form a roughed surface. Exterior engagement surface 38 may be coated with a high coefficient of friction material such as an elastomeric material, for example, rubber. As shown in FIGS. 5-8, exterior engagement surface 38 of hub 36 may include a plurality of teeth 44 that are located around the perimeter of exterior engagement surface 38 with each tooth extending between inner edge 40 and outer edge 42 of exterior engagement surface 38, the teeth 44 forming a plurality of alternating peaks and valleys.

Figure 3:
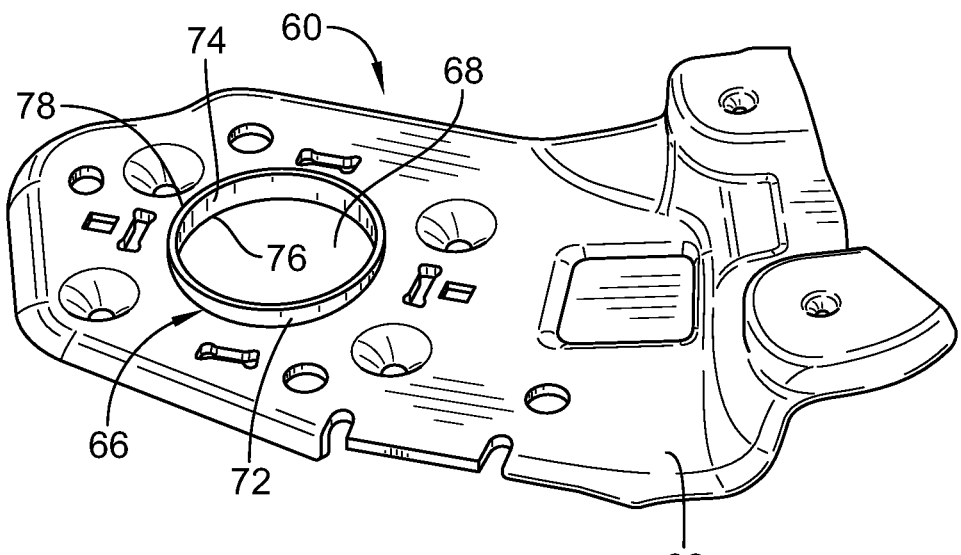
FIG. 3 is a perspective view of a bracket having a braking collar for inhibiting rotational movement of a pinion of the actuator when the pinion is displaced from an operational position to a displaced position.

Adjustment mechanism 10 includes a braking member 60, as generally shown in FIG. 3. Braking member 60 includes a mounting bracket 62. Mounting bracket 62 of braking member 60 is adapted to be connected fixedly to a base member such as vehicle seat 12. Braking member 60 includes a generally oval-shaped braking collar 66 connected to bracket 62. An oval-shaped aperture 68 extends through braking collar 66 and bracket 62. Braking collar 66 and aperture 68 include a central axis 70. Braking collar 66 includes a generally cylindrical exterior surface 72 and a generally cylindrical interior engagement surface 74. Exterior surface 72 and interior engagement surface 74 are both generally oval-shaped. Interior engagement surface 74 extends between an oval-shaped inner edge 76 and an oval-shaped outer edge 78. Alternatively, braking member 60 can be connected to an existing bracket having an aperture through which the pinion 28 extends in the operational position, with aperture 68 of braking collar 66 generally coaxially aligned therewith.

The interior engagement surface 74 of braking collar 66 may be treated to increase the coefficient of friction of the interior engagement surface 74. The interior engagement surface 74 of braking collar 66 may be treated such that interior engagement surface 74 is textured, such as by knurling, to form a roughened surface. Interior engagement surface 74 of braking collar 66 may be coated or covered with a high coefficient of friction material such as an elastomeric material, for example, rubber. Alternatively, as shown in FIGS. 5-8, interior engagement surface 74 of braking collar 66 may include a plurality of teeth 80. Teeth 80 extend around the perimeter of interior engagement surface 74 and between inner edge 76 and outer edge 78 of interior engagement surface 74, the teeth 80 forming a series of alternating ridges and valleys.

Braking collar 66 is generally oval-shaped and may be generally elliptical-shaped. Braking collar 66 includes a first end 84 and a diametrically opposed second end 86. First end 84 and second end 86 of braking collar 66 are generally pointed. Braking collar 66 includes a major axis that extends through central axis 70 and between first end 84 and second end 86 generally transverse to central axis 70. Braking collar 66 includes a minor axis that extends through central axis 70 generally transverse to the major axis and central axis 70. A first diameter of interior engagement surface 74 of braking collar 66 along the major axis is longer than a second diameter the interior engagement surface 74 along the minor axis. As shown in FIG. 6, the height of interior engagement surface 74 of braking collar 66 between first end 84 and second end 86 is longer than the transverse width of interior engagement surface 74.

Figure 4:
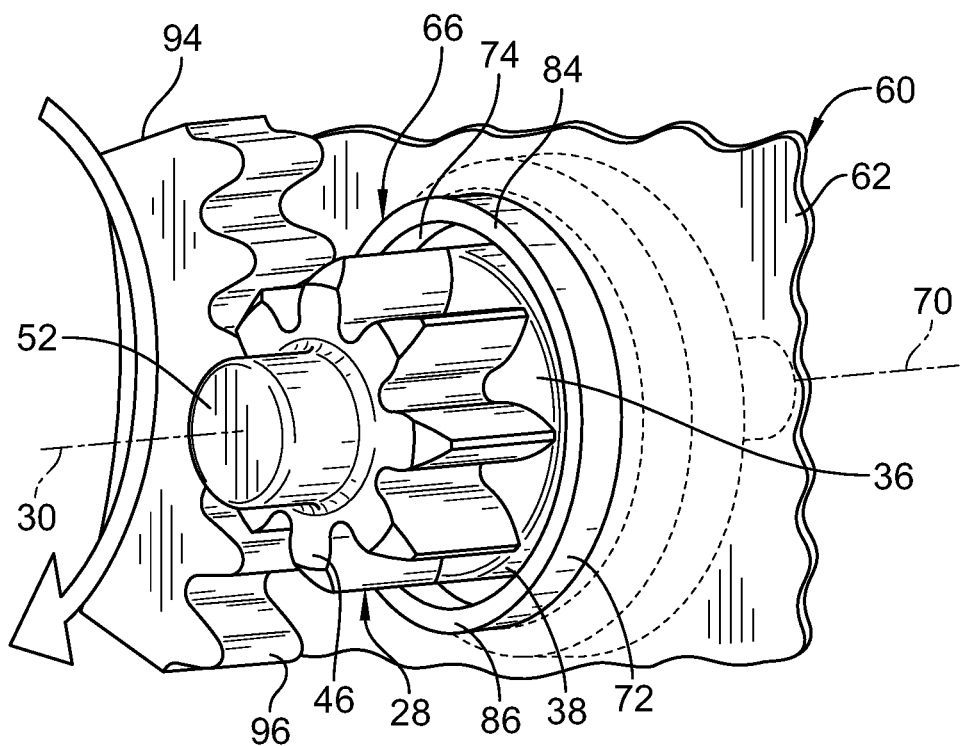
FIG. 4 is a partial perspective view showing the pinion of the actuator in operational engagement with a driven member.
Figure 5:
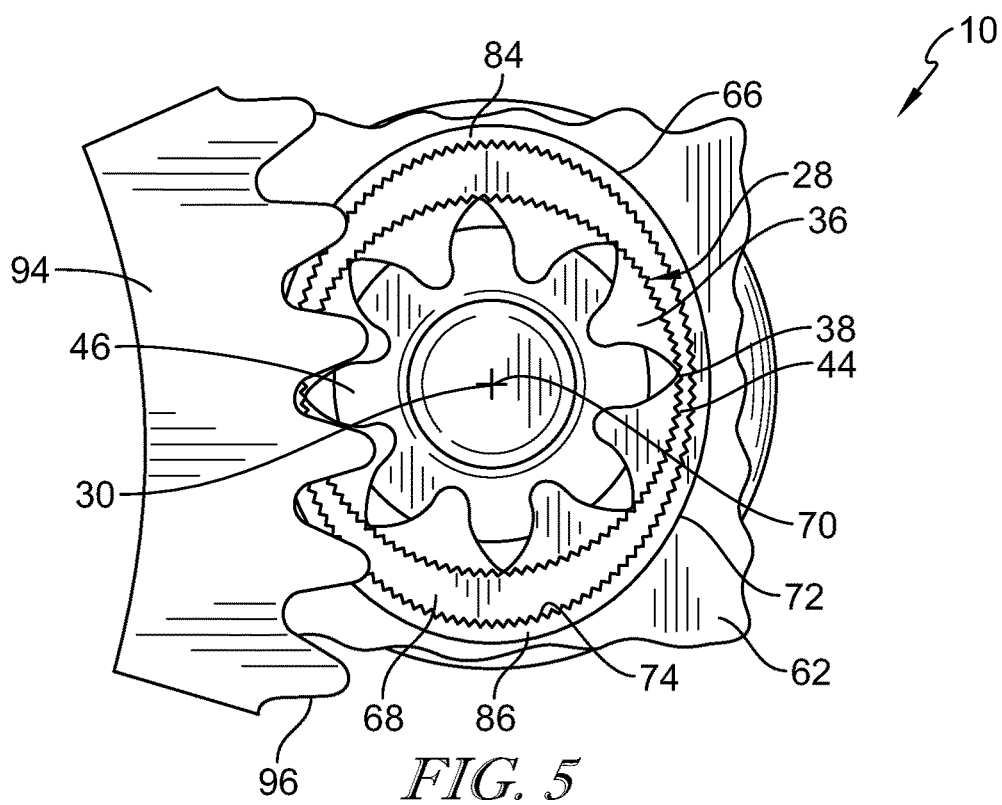
FIG. 5 is a partial front elevational view showing the pinion of the actuator in operational engagement with the driven member and with the pinion located in the operational position within the braking collar.

Pinion 28 of actuator 24 is adapted to operatively engage a driven member 94 that may be coupled to a component of the vehicle seat 12 as shown in FIGS. 4 and 5. Driven member 94 includes a plurality of gear teeth 96 adapted to operatively engage teeth 50 of gear 48 of pinion 28. Selective rotation of pinion 28 of actuator 24 about central axis 30 is adapted to move or rotate driven member 94 in either a clockwise direction or a counterclockwise direction.

Pinion 28 of actuator 24 is shown in an operational position in FIGS. 4-6, wherein central axis 30 of pinion 28 is generally concentrically aligned with central axis 70 of braking collar 66 of mounting member 60. When pinion 28 is in the operational position exterior engagement surface 38 of pinion 28 is spaced apart from interior engagement surface 74 of braking collar 66 around the entire perimeter of exterior engagement surface 38. Pinion 28 may thereby rotate about central axis 30 with respect to, and without engaging, interior engagement surface 74 of braking collar 66 when pinion 28 is in the operational position and thereby operatively move driven member 94 as desired.

When the vehicle is involved in a rear end crash, for example, pinion 28 is subjected to shear forces that radially displace pinion 28 from the operational position as shown in FIGS. 5 and 6, wherein central axis 30 of pinion 28 is substantially collinear with central axis 70 of braking collar 66, in a first radial direction toward first end 84 of braking collar 66 to a first displaced position as shown in FIG. 7. The first radial direction of displacement is generally transverse to central axes 30 and 70 and is illustrated with a dashed arrow. When pinion 28 is radially displaced to the first displaced position as shown in FIG. 7, exterior engagement surface 38 of pinion 28 engages interior engagement surface 74 of braking collar 66 at first end 84 of braking collar 66 in two spaced apart locations on opposite sides of first end 84 of braking collar 66. Exterior engagement surface 36 of pinion 28 engages a first braking segment 100 of interior engagement surface 74 of braking collar 66 and exterior engagement surface 38 of pinion 28 engages a second braking segment 102 of interior engagement surface 74 of braking collar 66 when pinion 28 is radially displaced from the operational position to the first displaced position, as shown in FIG. 7. As shown in FIG. 7, external engagement surface 36 of pinion 28 does not engage and is spaced apart from the portion of the internal engagement surface 74 of braking collar 66 that is located between first braking segment 100 and second braking segment 102 of interior engagement surface 74 when pinion 28 is in the first displaced position.

The dashed circles 104A-B in FIG. 6 generally illustrate the portions of the exterior engagement surface 38 of pinion 28 and the first braking segment 100 and second braking segment 102 of interior engagement surface 74 of braking collar 66, that come into a braking engagement with one another when pinion 28 is displaced to the first displaced position as shown in FIG. 7. The engagement between exterior engagement surface 38 of pinion 28 and interior engagement surface 74 of braking collar 66, when pinion 28 is in the first displaced position, inhibits or blocks rotation of pinion 28 about central axis 30 with respect to braking collar 66. The braking force applied by braking collar 66 on pinion 28 may be provided by frictional forces therebetween, or by the mechanical meshing engagement of the teeth 44 of exterior engagement surface 38 of pinion 28 and teeth 80 of interior engagement surface 74 of braking collar 66.

When the vehicle is involved with a front end crash, for example, pinion 28 is subjected to shear forces that radially displace pinion 28 from the operational position as shown in FIGS. 5 and 6, wherein central axis 30 of pinion 28 is substantially collinear with central axis 70 of braking collar 66, in a second radial direction toward second end 86 of braking collar 66 to a second displaced position as shown in FIG. 8. The second radial direction of displacement is generally transverse to central axes 30 and 70, and is generally opposite in direction to the first radial direction of displacement, as illustrated by the solid arrows in FIGS. 6 and 8. When pinion 28 is radially displaced to the second displaced position as shown in FIG. 8, exterior engagement surface 38 of pinion 28 engages interior engagement surface 74 of braking collar 66 at second end 86 of braking collar 66 in two spaced apart locations on opposite sides of second end 86 of braking collar 66. Exterior engagement surface 36 of pinion 28 engages a third braking segment 110 of interior engagement surface 74 of braking collar 66 and exterior engagement surface 38 of pinion 28 engages a fourth braking segment 112 of braking collar 66 when pinion 28 is radially displaced from the operational position to the second displaced position as shown in FIG. 8. As shown in FIG. 8, external engagement surface 36 of pinion 28 does not engage and is spaced apart from the portion of the internal engagement surface 74 of braking collar 66 located between third braking segment 110 and fourth braking segment 112 of interior engagement surface 74 when pinion 28 is in the second displaced position.

The solid circles 114A-B in FIG. 6 generally illustrate the portions of the exterior engagement surface 38 of pinion 28 and the third braking segment 110 and fourth braking segment 112 of the braking collar 66 that come into a braking engagement with one another when pinion 28 is displaced to the second displaced position as shown in FIG. 8. The engagement between exterior engagement surface 38 of pinion 28 and interior engagement surface 74 of braking collar 66 when pinion 28 is in the second displaced position, inhibits or blocks rotation of pinion 28 about central axis 30 with respect to braking collar 66. The braking force applied by braking collar 66 on pinion 28 may be provided by frictional forces therebetween, or by the mechanical meshing engagement of the teeth 44 of exterior engagement surface 38 of pinion 28 and teeth 80 of interior engagement surface 74 of braking collar 66.

Braking collar 66 as shown in FIG. 3-8 extends substantially continuously around central axis 70. However, if desired, braking collar 66 may comprise a discontinuous oval-shaped braking collar including spaced apart discrete braking segments 100, 102, 110 and 112 as shown in FIG. 9. First and second braking segments 100 and 102 include interior engagement surface 74 and are adapted to engage exterior engagement surface 38 of pinion 28 when pinion 28 is in the first displaced position, and third and fourth braking segments 110 and 112 include interior engagement surface 74 and are adapted to engage exterior engagement surface 38 of pinion 28 when pinion 28 is displaced to the second displaced position. Interior engagement surface 74 may be integrally formed with each braking segment 100, 102, 110 and 112. As shown in FIG. 9, braking segments 100, 102, 110 and 112 of braking collar 66 can be retrofit to a braking member 60 having a generally smooth circular aperture 118 to provide the benefits of the oval-shaped braking collar 66. While aperture 118 may be generally circular, interior engagement surfaces 74 of braking segments 100, 102, 110 and 112 are located to conform to the configuration of portions of an oval-shaped interior engagement surface.

The engagement of the exterior engagement surface 38 of pinion 28 with two spaced apart braking segments of the interior engagement surface 74 of braking collar 66 when pinion 28 is displaced from an operational position to a displaced position, by either a front crash or a rear crash of the vehicle, brakes or stops rotation of pinion 28 with a minimal amount of rotation of pinion 28 about central axis 30 of pinion 28. FIG. 10 illustrates in a dashed line the rotation of the pinion 28 about central axis 30 in degrees with respect to the torsional force on pinion 28 when the pinion 28 is displaced due to a crash, when teeth 44 of exterior engagement surface 38 of pinion 28 engage teeth 80 of interior engagement surface 74 of braking collar 66 as disclosed herein. The solid line in FIG. 10 illustrates the rotation of a pinion in degrees with respect to the torsional force on the pinion when the vehicle is involved in a crash and the pinion 28 is displaced and engages a single segment of a generally smooth circular aperture in a member. As shown in FIG. 10 use of teeth on exterior engagement surface 38 of pinion 28 that engage teeth 80 on two braking segments of an oval-shaped braking collar 66 allows much less rotation of the pinion.

The following numbered clauses include embodiments that are contemplated and non-limiting:

Clause 1. An adjustment mechanism for a vehicle, the adjustment mechanism comprising an actuator including a rotatable pinion having a central axis, the pinion including a peripheral exterior engagement surface and a drive member adapted to rotate about the central axis of the pinion, the drive member adapted to operatively engage a driven member and provide selective movement of the driven member when the pinion is in an operational position.

Clause 2. The adjustment mechanism of clause 1, any other clause, or any combination of clauses, wherein the pinion is radially displaceable from the operational position in a first radial direction to a first displaced position and the pinion being radially displaceable from the operational position in a second radial direction to a second displaced position.

Clause 3. The adjustment mechanism of clause 2, any other clause, or any combination of clauses, further comprising a braking member including a braking collar having an aperture with a central axis.

Clause 4. The adjustment mechanism of clause 3, any other clause, or any combination of clauses, wherein the braking collar includes an interior engagement surface extending about the central axis of the aperture of the braking collar.

Clause 5. The adjustment mechanism of clause 4, any other clause, or any combination of clauses, wherein the central axis of the pinion is generally coaxially aligned with the central axis of the aperture of the braking collar when the pinion is in the operational position.

Clause 6. The adjustment mechanism of clause 5, any other clause, or any combination of clauses, wherein the exterior engagement surface of the pinion is spaced apart from the interior engagement surface of the braking collar when the pinion is in the operational position such that the pinion is selectively rotatable about the central axis of the pinion with respect to the braking collar.

Clause 7. The adjustment mechanism of clause 6, any other clause, or any combination of clauses, whereby when the pinion is displaced from the operational position to the first displaced position of the pinion the exterior engagement surface of the pinion engages the interior engagement surface of the braking collar such that the braking collar inhibits rotation of the pinion about the central axis of the pinion.

Clause 8. The adjustment mechanism of clause 7, any other clause, or any combination of clauses, whereby when the pinion is displaced from the operational position to the second displaced position of the pinion the exterior engagement surface of the pinion engages the interior engagement surface of the braking collar such that the braking collar inhibits rotation of the pinion about the central axis of the pinion.

Clause 9. The adjustment mechanism of clause 8, any other clause, or any combination of clauses, wherein the braking member includes a mounting bracket, the aperture of the braking collar extending through the mounting bracket, the mounting bracket adapted to be coupled to a base member.

Clause 10. The adjustment member of clause 8, any other clause, or any combination of clauses, wherein the interior engagement surface of the braking collar is generally oval shaped and includes a first end and a second end opposing the first end, the interior engagement surface of the braking collar having a first diameter extending from the first end to the second end of the interior engagement surface of the braking collar, and a second diameter extending transversely to the first diameter, the first diameter being longer than the second diameter.

Clause 11. The adjustment mechanism of clause 10, any other clause, or any combination of clauses, wherein the interior engagement surface of the braking collar is generally elliptical shaped.

Clause 12. The adjustment mechanism of clause 8, any other clause, or any combination of clauses, wherein the interior engagement surface of the braking collar is generally oval shaped and includes a first end and an opposing second end, whereby when the pinion is displaced to the first displaced position the pinion moves radially from the operational position toward the first end of the braking collar and the exterior engagement surface of the pinion engages the interior engagement surface of the braking collar at a first braking segment of the braking collar and at a second braking segment of the braking collar at the first end of the braking collar, the first braking segment being spaced apart from the second braking segment.

Clause 13. The adjustment mechanism of clause 12, any other clause, or any combination of clauses, whereby when the pinion is displaced to the second displaced position the pinion moves radially from the operational position toward the second end of the braking collar and the exterior engagement surface of the pinion engages the interior engagement surface of the braking collar at a third braking segment of the braking collar and at a fourth braking segment of the braking collar at the second end of the braking collar, the third braking segment being spaced apart from the fourth braking segment.

Clause 14. The adjustment mechanism of clause 8, any other clause, or any combination of clauses, wherein the exterior engagement surface of the pinion is treated to increase the coefficient of friction of the exterior engagement surface of the pinion, and the interior engagement surface of the braking collar is treated to increase the coefficient of friction of the interior engagement surface of the braking collar.

Clause 15. The adjustment mechanism of clause 14, any other clause, or any combination of clauses, wherein the exterior engagement surface of the pinion is textured, and the interior engagement surface of the collar is textured.

Clause 16. The adjustment mechanism of clause 8, any other clause, or any combination of clauses, wherein the exterior braking surface of the pinion includes a plurality of teeth, and the interior engagement surface of the collar includes a plurality of teeth, the teeth of the exterior engagement surface of the pinion adapted to engage the teeth of the interior engagement surface of the braking collar when the pinion is displaced to the first displaced position of the pinion, and the teeth of the interior engagement surface of the pinion adapted to engage the teeth of the interior engagement surface of the braking collar when the pinion is displaced to the second displaced position of the pinion.

Clause 17. The adjustment mechanism of clause 8, any other clause, or any combination of clauses, wherein the second radial direction of radial displacement of the pinion from the operational position is substantially opposite in direction from the first radial direction of radial displacement of the pinion from the operational position.

Clause 18. The adjustment mechanism of clause 8, any other clause, or any combination of clauses, wherein the pinion includes a generally cylindrical hub, the hub including the exterior engagement surface of the pinion, and the drive member of the pinion comprises a drive gear having a plurality of gear teeth, the drive gear being located longitudinally outwardly from the hub along the central axis of the pinion.

Clause 19. The adjustment mechanism of clause 8, any other clause, or any combination of clauses, wherein the braking collar comprises a first braking segment, a second braking segment, a third braking segment and a fourth braking segment, each of the braking segments being spaced apart from one another and including the interior engagement surface of the braking collar, the exterior engagement surface of the pinion adapted to engage the first braking segment and the second braking segment of the braking collar when the pinion is displaced from the operational position toward the first displaced position of the pinion, and the exterior engagement surface of the pinion adapted to engage the third braking segment and the fourth braking segment of the braking collar when the pinion is displaced from the operational position toward the second displaced position of the pinion.

Clause 20. A method of inhibiting rotational movement of a rotatable pinion when the pinion is radially displaced from an operational position to either a first displaced position or a second displaced position, the method comprising the steps of:

providing an exterior engagement surface on the pinion.

Clause 21. The method of clause 20, any other clause, or any combination of clauses, further comprising the step of providing a braking collar having an aperture and a generally oval shaped interior engagement surface disposed about a central axis of the aperture.

Clause 22. The method of clause 21, any other clause, or any combination of clauses, further comprising the step of engaging the exterior engagement surface of the pinion with the interior engagement surface of the braking collar when the pinion is displaced from the operational position to the first displaced position to thereby inhibit rotation of the pinion.

Clause 23. The method of clause 22, any other clause, or any combination of clauses, further comprising the step of engaging the exterior engagement surface of the pinion with the interior engagement surface of the collar when the pinion is displaced from the operational position to the second displaced position to thereby inhibit rotation of the pinion.

Clause 24. The method of clause 23, any other clause, or any combination of clauses, including engaging the exterior engagement surface of the pinion with first and second braking segments of the interior engagement surface of the braking collar when the pinion is displaced to the first displaced position.

Clause 25. The method of clause 24, any other clause, or any combination of clauses, including engaging the exterior engagement surface of the pinion with third and fourth braking segments of the interior braking surface of the braking collar when the pinion is displaced to the second displaced position.

The invention claimed is:

1. An adjustment mechanism for a vehicle, the adjustment mechanism comprising:
an actuator including a rotatable pinion having a central axis, the pinion including a peripheral exterior engagement surface and a drive member adapted to rotate about the central axis of the pinion, the drive member adapted to operatively engage a driven member and provide selective movement of the driven member when the pinion is in an operational position, the pinion being radially displaceable from the operational position in a first radial direction to a first displaced position and the pinion being radially displaceable from the operational position in a second radial direction to a second displaced position;
a braking member including a braking collar having an aperture with a central axis, the braking collar including an interior engagement surface extending about the central axis of the aperture of the braking collar, the central axis of the pinion being generally coaxially aligned with the central axis of the aperture of the braking collar when the pinion is in the operational position, the exterior engagement surface of the pinion being spaced apart from the interior engagement surface of the braking collar when the pinion is in the operational position such that the pinion is selectively rotatable about the central axis of the pinion with respect to the braking collar;
whereby when the pinion is displaced from the operational position to the first displaced position of the pinion the exterior engagement surface of the pinion engages the interior engagement surface of the braking collar such that the braking collar inhibits rotation of the pinion about the central axis of the pinion, and when the pinion is displaced from the operational position to the second displaced position of the pinion the exterior engagement surface of the pinion engages the interior engagement surface of the braking collar such that the braking collar inhibits rotation of the pinion about the central axis of the pinion; wherein the interior engagement surface of the braking collar is generally oval shaped.

2. The adjustment mechanism of claim 1, wherein the braking member includes a mounting bracket, the aperture of the braking collar extending through the mounting bracket, the mounting bracket adapted to be coupled to a base member.

3. The adjustment member of claim 1, wherein the interior engagement surface of the braking collar includes a first end and a second end opposing the first end, the interior engagement surface of the braking collar having a first diameter extending from the first end to the second end of the interior engagement surface of the braking collar, and a second diameter extending transversely to the first diameter, the first diameter being longer than the second diameter.

4. The adjustment mechanism of claim 3, wherein the interior engagement surface of the braking collar is generally elliptical shaped.

5. The adjustment mechanism of claim 1, wherein the interior engagement surface of the braking collar includes a first end and an opposing second end, whereby when the pinion is displaced to the first displaced position the pinion moves radially from the operational position toward the first end of the braking collar and the exterior engagement surface of the pinion engages the interior engagement surface of the braking collar at a first braking segment of the braking collar and at a second braking segment of the braking collar at the first end of the braking collar, the first braking segment being spaced apart from the second braking segment.

6. The adjustment mechanism of claim 5, whereby when the pinion is displaced to the second displaced position the pinion moves radially from the operational position toward the second end of the braking collar and the exterior engagement surface of the pinion engages the interior engagement surface of the braking collar at a third braking segment of the braking collar and at a fourth braking segment of the braking collar at the second end of the braking collar, the third braking segment being spaced apart from the fourth braking segment.

7. The adjustment mechanism of claim 1, wherein the exterior engagement surface of the pinion is treated to increase the coefficient of friction of the exterior engagement surface of the pinion, and the interior engagement surface of the braking collar is treated to increase the coefficient of friction of the interior engagement surface of the braking collar.

8. The adjustment mechanism of claim 7, wherein the exterior engagement surface of the pinion is textured, and the interior engagement surface of the collar is textured.

9. The adjustment mechanism of claim 1, wherein the exterior braking surface of the pinion includes a plurality of teeth, and the interior engagement surface of the collar includes a plurality of teeth, the teeth of the exterior engagement surface of the pinion adapted to engage the teeth of the interior engagement surface of the braking collar when the pinion is displaced to the first displaced position of the pinion, and the teeth of the interior engagement surface of the pinion adapted to engage the teeth of the interior engagement surface of the braking collar when the pinion is displaced to the second displaced position of the pinion.

10. The adjustment mechanism of claim 1, wherein the second radial direction of radial displacement of the pinion from the operational position is substantially opposite in direction from the first radial direction of radial displacement of the pinion from the operational position.

11. The adjustment mechanism of claim 1, wherein the pinion includes a generally cylindrical hub, the hub including the exterior engagement surface of the pinion, and the drive member of the pinion comprises a drive gear having a plurality of gear teeth, the drive gear being located longitudinally outwardly from the hub along the central axis of the pinion.

12. A method of inhibiting rotational movement of a rotatable pinion when the pinion is radially displaced from an operational position to either a first displaced position or a second displaced position, the method comprising the steps of:

providing an exterior engagement surface on the pinion;
providing a braking collar having an aperture and a generally oval shaped interior engagement surface disposed about a central axis of the aperture;
engaging the exterior engagement surface of the pinion with the interior engagement surface of the braking collar when the pinion is displaced from the operational position to the first displaced position to thereby inhibit rotation of the pinion, and engaging the exterior engagement surface of the pinion with the interior engagement surface of the collar when the pinion is displaced from the operational position to the second displaced position to thereby inhibit rotation of the pinion.

13. The method of claim 12, including engaging the exterior engagement surface of the pinion with first and second braking segments of the interior engagement surface of the braking collar when the pinion is displaced to the first displaced position.

14. The method of claim 13, including engaging the exterior engagement surface of the pinion with third and fourth braking segments of the interior braking surface of the braking collar when the pinion is displaced to the second displaced position.

* * * * *